(12) United States Patent
Kumar et al.

(10) Patent No.: US 7,016,484 B2
(45) Date of Patent: Mar. 21, 2006

(54) SYSTEM AND METHOD FOR EFFECTING INSIDE PLANT LOAD BALANCING IN A TELECOMMUNICATIONS SYSTEM

(75) Inventors: Ashok Kumar, Tampa, FL (US); Ravi Guduru, Tampa, FL (US)

(73) Assignee: Verizon Corporate Services Group Inc., New York, NY (US)

( * ) Notice: Subject to any disclaimer, the term of this patent is extended or adjusted under 35 U.S.C. 154(b) by 1085 days.

(21) Appl. No.: 09/736,934

(22) Filed: Dec. 14, 2000

(65) Prior Publication Data

US 2002/0126823 A1  Sep. 12, 2002

Related U.S. Application Data

(60) Provisional application No. 60/240,242, filed on Oct. 13, 2000.

(51) Int. Cl.
*H04M 7/00* (2006.01)
(52) U.S. Cl. ................................ 379/221.06
(58) Field of Classification Search ............. 718/105, 718/104; 370/221, 392, 400, 231, 292; 379/221.06, 379/219; 709/226
See application file for complete search history.

(56) References Cited

U.S. PATENT DOCUMENTS

| | | | | |
|---|---|---|---|---|
| 4,974,256 A | * | 11/1990 | Cyr et al. | 379/112.04 |
| 5,655,120 A | * | 8/1997 | Witte et al. | 718/105 |
| 5,757,903 A | * | 5/1998 | Welter, Jr. | 379/229 |
| 5,809,282 A | * | 9/1998 | Cooper et al. | 709/226 |
| 5,864,535 A | * | 1/1999 | Basilico | 370/231 |
| 6,393,483 B1 | * | 5/2002 | Latif et al. | 709/226 |
| 6,831,971 B1 | * | 12/2004 | Wellner et al. | 379/202.01 |

* cited by examiner

*Primary Examiner*—Sue Lao
(74) *Attorney, Agent, or Firm*—Leonard C. Suchtya, Esq.; Fitzpatrick, Cella et al.

(57) ABSTRACT

The present invention utilizes a software application running on a digital computer (20) to enable a load balancing technician to assign customers services by assigning a specific port on a specific card in a telecommunications switch (10) to a service, while at the same time ensuring that load balancing criteria are met. The software performs a method in which a list is compiled of switches, cards and ports available for providing a service, and a port for providing a desired service is selected (steps S1–S9) based on loading factors, weighting factors for which can be set by the load balancing technician.

20 Claims, 3 Drawing Sheets

SYSTEM AND METHOD FOR EFFECTING INSIDE PLANT LOAD BALANCING IN A TELECOMMUNICATIONS SYSTEM

CROSS-REFERENCE TO RELATED APPLICATIONS

This application claims benefit of U.S. Provisional Application No. 60/240,242, filed Oct. 13, 2000, which is hereby incorporated by reference.

BACKGROUND OF THE INVENTION

1. Field of the Invention

The present invention relates generally to the field of assigning, activating and inventorying of telecommunications services, and more specifically relates to switch load balancing in assignment of services to customers of a telecommunications company.

2. Related Art

In local loop assignment and provisioning by a telephone company (telco), each telecommunications switch controlled by the telco includes individual cards, each having ports. Ports in a switch serve every customer's telephone service. The ports can cater to all the features, or services, requested by the customer, such as call waiting, call forwarding, or the like. Conventionally, port selection has been performed in an ad hoc manner. In the prior art method, technicians have been unable to take into account the load balancing of the switches when providing new features or services.

Specifically, since new services are supplied on an ad hoc basis, it is difficult for a technician to avoid overloading particular switches or cards on the switch. Such overloading can include the utilization, or assignment, of too many ports out of a particular subgroup of ports, or providing too many ports for a particular type of service, for example, ISDN, in a particular group of ports. An additional loading issue that is not addressed is the fact that the prior art method of allocating services to ports does not systematically take into account the distance between the port to be assigned and the frame to which the port will be connected. Thus, in the prior art method, it is difficult to minimize the length of jumper wires used to connect the ports to the frame. In view of the foregoing, it has been difficult to ensure that adding new services or customers does not overload central office (CO) hardware and software.

SUMMARY OF INVENTION

In view of the deficiencies of the prior art, there is provided a system and method for effecting switch load balancing in a telecommunications system. In particular, there is provided a method for load balancing a telecommunications switch in a telecommunications system, the switch including a plurality of cards, each having a plurality of ports, each port being adapted to provide a customer with one or more telecommunications services. The method comprises: compiling a list of switches, cards and ports available for providing the desired services; and selecting a port for provision of the desired service on the basis of one or more of (a) a loading of ports on the card on which the port under consideration is located, (b) a loading of services on the card, (c) a length of jumper wire necessary to connect the port under consideration to a frame in a telecommunications central office, (d) a cost of the card on which the port under consideration is located, and (e) selected percentage weighting factors for the respective priorities of (a), (b) and (c).

In accordance with another aspect of the present invention, there is provided a computer-readable memory medium for controlling a processor-controlled apparatus to load balance a telecommunications switch in a telecommunications system. The switch includes a plurality of cards, each having a plurality of ports. Each port is adapted to provide a customer with one or more telecommunications services. The apparatus being controlled to perform a method comprising: compiling a list of switches, cards and ports available for providing the desired services; and selecting a port for provision of the desired service on the basis of one or more of (a) a loading of ports on the card on which the port under consideration is located, (b) a loading of services on the card, (c) a length of jumper wire necessary to connect the port under consideration to a frame in a telecommunications central office, (d) a cost of the card on which the port under consideration is located, and (e) selected percentage weighting factors for the respective priorities of (a), (b) and (c).

In accordance with still another aspect of the present invention, there is provided an apparatus adapted to load balance a telecommunications switch in a telecommunications system, the switch including a plurality of cards, each having a plurality of ports, each port being adapted to provide a customer with one or more telecommunications services. The apparatus comprises: means for compiling a list of switches, cards and ports available for providing the desired services; and means for selecting a port for provision of the desired service on the basis of one or more of (a) a loading of ports on the card on which the port under consideration is located, (b) a loading of services on the card, (c) a length of jumper wire necessary to connect the port under consideration to a frame in a telecommunications central office, (d) a cost of the card on which the port under consideration is located, and (e) selected percentage weighting factors for the respective priorities of (a), (b) and (c).

In accordance with yet another aspect of the present invention, there is provided computer code for controlling a computer to load balance a telecommunications switch in a telecommunications system, the switch including a plurality of cards, each having a plurality of ports, each port being adapted to provide a customer with one or more telecommunications services. The computer code comprises: code for compiling a list of switches, cards and ports available for providing the desired services; and code for selecting a port for provision of the desired service on the basis of one or more of (a) a loading of ports on the card on which the port under consideration is located, (b) a loading of services on the card, (c) a length of jumper wire necessary to connect the port under consideration to a frame in a telecommunications central office, (d) a cost of the card on which the port under consideration is located, and (e) selected percentage weighting factors for the respective priorities of (a), (b) and (c).

DETAILED DESCRIPTION OF THE PREFERRED EMBODIMENTS

Figure 1:
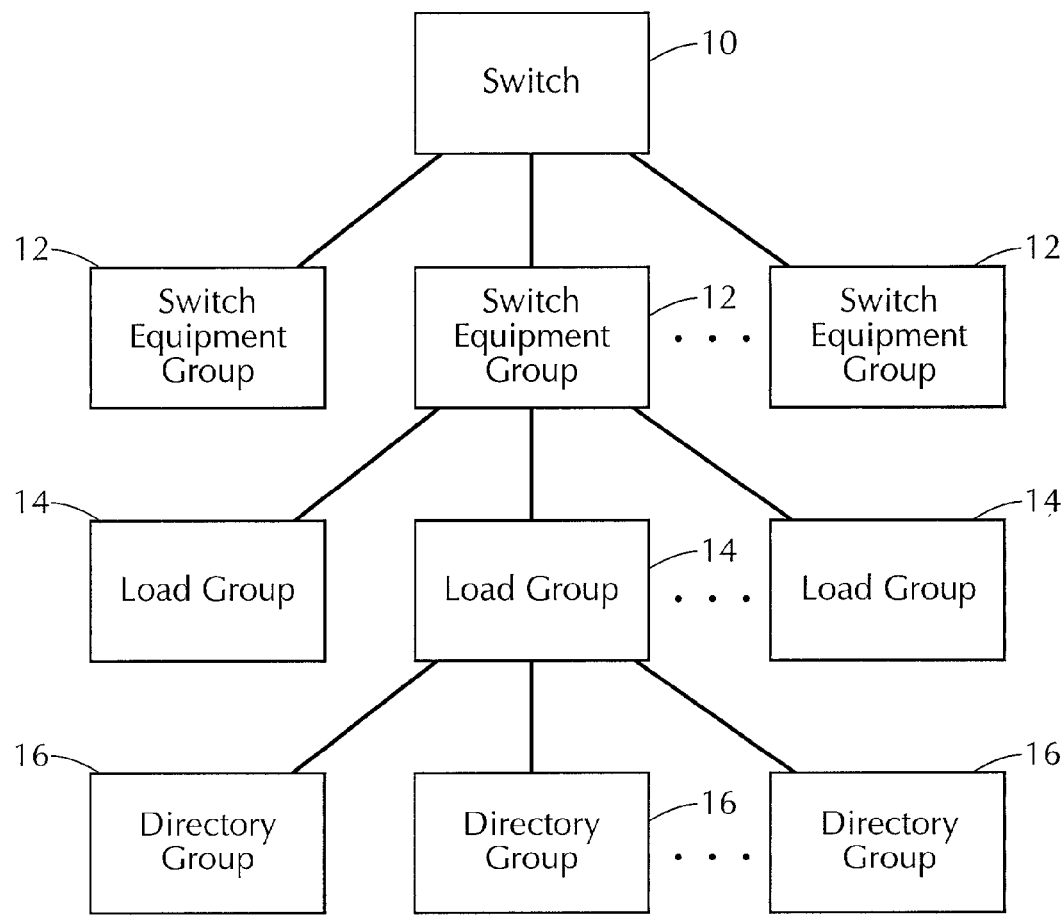
FIG. 1 is a diagram showing the relation between switches, switch equipment groups, load groups and directory groups.

Switches located in telecommunications central offices are used to connect to customer telephone equipment. Each switch includes a large number of cards, with each card having a number of ports. The ports on each switch are grouped hierarchically in three levels as shown in FIG. 1. As can be seen in the figure, the ports of a switch 10 are divided at a first level into switch equipment groups 12, for example of 100 ports each. Each switch equipment group 12 can be subdivided further into load groups 14, which may have, for example 10 ports each. In this example, each switch equipment group 12 would have 10 load groups associated with it. The lowest level of port subdivision is referred to as a directory group 16. This is the level at which connection to the frame is effected, that is, ports are jumpered to a frame in units of directory groups, not in single units of ports.

A directory group is a minimum number of ports used as a unit for mapping ports on a frame at a central office, as well as for inventory of the ports. As can be seen from the figure, each load group 14 is divided into several directory groups 16.

ISP (InSide Plant) load balancing is the term used for ensuring that in assigning card ports for providing customer services, a number of load balancing criteria are satisfied. The present invention utilizes a software application running on a digital computer that enables a load balancing technician to assign customers services by connecting line equipment (LNI) to a specific port on a specific card in a telecommunications switch, while at the same time ensuring that load balancing criteria are met.

Figure 2:
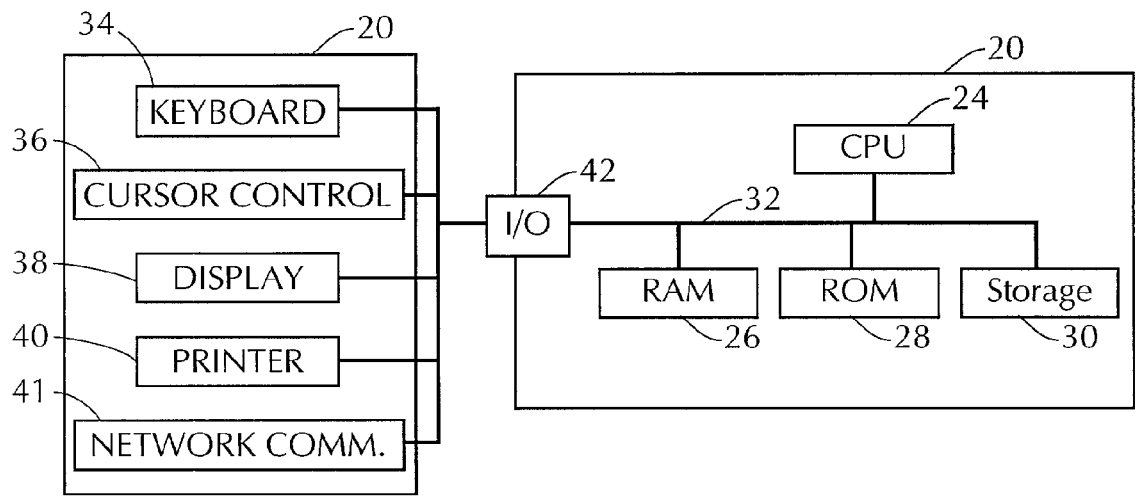
FIG. 2 is a block diagram of a computer system of a type on which the present invention may be implemented.

FIG. 2 shows a computer system of a type that may be used to implement the present invention. However, the actual hardware components shown are for illustrative purposes only. As will be appreciated from the ensuing detailed description, the present invention may be implemented using other configurations, including but not limited to being implemented as a server on a network or in a distributed processing environment.

As shown in FIG. 2, a computer system includes a computer 20 that interfaces with various external peripheral devices 22. The computer has a central processing unit (CPU) 24 and devices to store information. The information storage devices comprise random access memory (RAM) 26, for short term, scratchpad storage, read only memory (ROM), typically used for applications that do not change, and mass storage 30, which may comprise, for example, a magnetic or optical disk, or other media appropriate for long term storage, for example of databases and the like. Communication between the CPU 24 and these other devices is effected over system bus 32.

External peripheral devices 20 interface with the computer system 20 via I/O interface 42. The peripheral devices preferably include, for example, a keyboard 34, cursor control 36, such as a mouse, a display 38, a printer 40, and a network communication device 41, to allow the computer to communicate over a local area network (LAN), or directly over wider area networks such as the Internet, or over a LAN that allows the computer to interface with the Internet or other wide area network (WAN).

As will be developed below, the software of the present invention, in a preferred embodiment, considers multiple factors in determining port/card assignments, including card type/cost, load group, service class group and jumper length, and allows a technician to specify the weight given to each factor in making the determination. The software preferably runs as a part of an overall provisioning system that would allow a technician to see, using a graphical user interface (GUI) screens, the various current hardware and feature attributes of the telecommunication system. However, the invention can instead be implemented as a standalone processing system having access to database of information relating to the various switches, cards and ports available in the telecommunications system.

Certain of these load balancing factors will now be discussed. Card type/cost is a factor that is considered in load balancing. Every port is part of a card which itself has a cost associated with it. The card/cost factor takes into account the fact that certain cards support certain features, e.g., four-way calling, caller ID, etc. The software of the present invention is structured to examine the available cards and assign a customer to a card that supports no more features than the customer actually requires. In a preferred embodiment, the software requires that the cheapest card for provisioning a given service is always the one selected.

The load group factor is another factor taken into account in load balancing. Each card on a switch has a given number of ports to support a given number of customers. To properly balance the load on a switch, it is necessary to take into account the fact that only a certain percentage of these ports may be used at any given time without overloading the switch. This determination is made at the load group level. The software has access to a list of available card types that are on the switch and which support the features in question. To properly account for the load group factor, the list contains only card types that actually have available ports on the switch. If, for example, a card type is listed with an indication that it is for a coin-operated telephone, and a current request is for residence or business or inward service for Centrex (IWTS) or a special feature service, such as ADSL, card types that support coin or ISDN service are removed from the list of candidates to considered by the load balancing program of the present invention for providing the requested service.

Service class group (SCG) is term that will be used throughout the following description. The service class group defines the type of service and customer class. For example, some customers are residential customers, and some are business customers, and some receive priority over others. The particular service class group is a factor that must be taken into account in load balancing, since too many ports assigned, for example, to provided ISDN service concentrated in one physical area would overload the switching hardware and/or software.

Another factor that is taken into account by the present invention when assigning ports is the jumper length factor. A feeder connecting to a customer enters a telecommunications switch at a given frame in the telecommunications central office (CO), and is connected from the frame to a port by a jumper. Each time a new customer must be provided with service, a new jumper may have to be provided. However, it is important that jumpers generally be chosen that are only as long as is necessary, to minimize the amount of cabling in the CO. Generally, the software of the present invention applies the criteria that shorter jumpers are to be preferred over longer jumpers.

The present invention utilizes software that takes into account the above-mentioned factors when assigning line equipment (LNI). Each of these factors may differ in importance in a particular case. Accordingly, the present invention allows a technician to specify a percentage weighting to be applied to each factor. The software of the present invention assigns ports to optimize the above-mentioned factors, taking into account the percentage weight assigned to each factor by the technician. By use of the software of the present invention, load balancing of the switch can be maintained in providing new services to customers.

The process utilized by the present invention to take into account the above-mentioned factors and weighting criteria and select the particular card and port that best meets the load balancing requirements for a requested service is next discussed with reference to the flow charts of FIGS. 3 and 4.

The first step that must be taken is to select a switch. In the case of foreign exchange service, the switch is taken from the service package. Otherwise, a set of preferred switches is selected as follows. A list of switches is obtained for the wire center and location. Then, the list is examined and if any of the following criteria are not satisfied, the switch is discarded: (a) the switch capacity must not exceed a pre-set capacity for each switch. This capacity is measured as a percentage of working ports to equipped ports; (b) the switch must support the telephone number to be provided service; (c) the switch must support the requested party position; (d) the switch must not block any of the requested features at the requested location; (e) the switch must support the requested features; (f) software features must be supported by a meta switch (a software template table defining the properties of a switch) corresponding to this switch; (g) hardware features must be supported by at least one meta card corresponding to the actual cards on the switch; and (h) features which are both hardware and software features must be supported by both the switch at least one of its cards.

Once the list of switches has been obtained, it is sorted according to the switch preference, if one has been specified, for any feature to be provided. The switch preferences preferably can be specified by a graphical user interface (GUI) switch preference screen. If none are selected, a predetermined default switch preference is used. If there is no switch preference, the switches are used in random order.

Second, line equipment (LNI) is selected. For each switch, LNI selection is attempted as follows. A list of available card types that are on the switch and support the features is obtained. This list contains only card types that actually have available ports on the switch. For example, if a card is for coin service only, and the current request is for residence or business or IWTS or special feature service, such card type that supports coin service is removed from this list.

Figure 3:
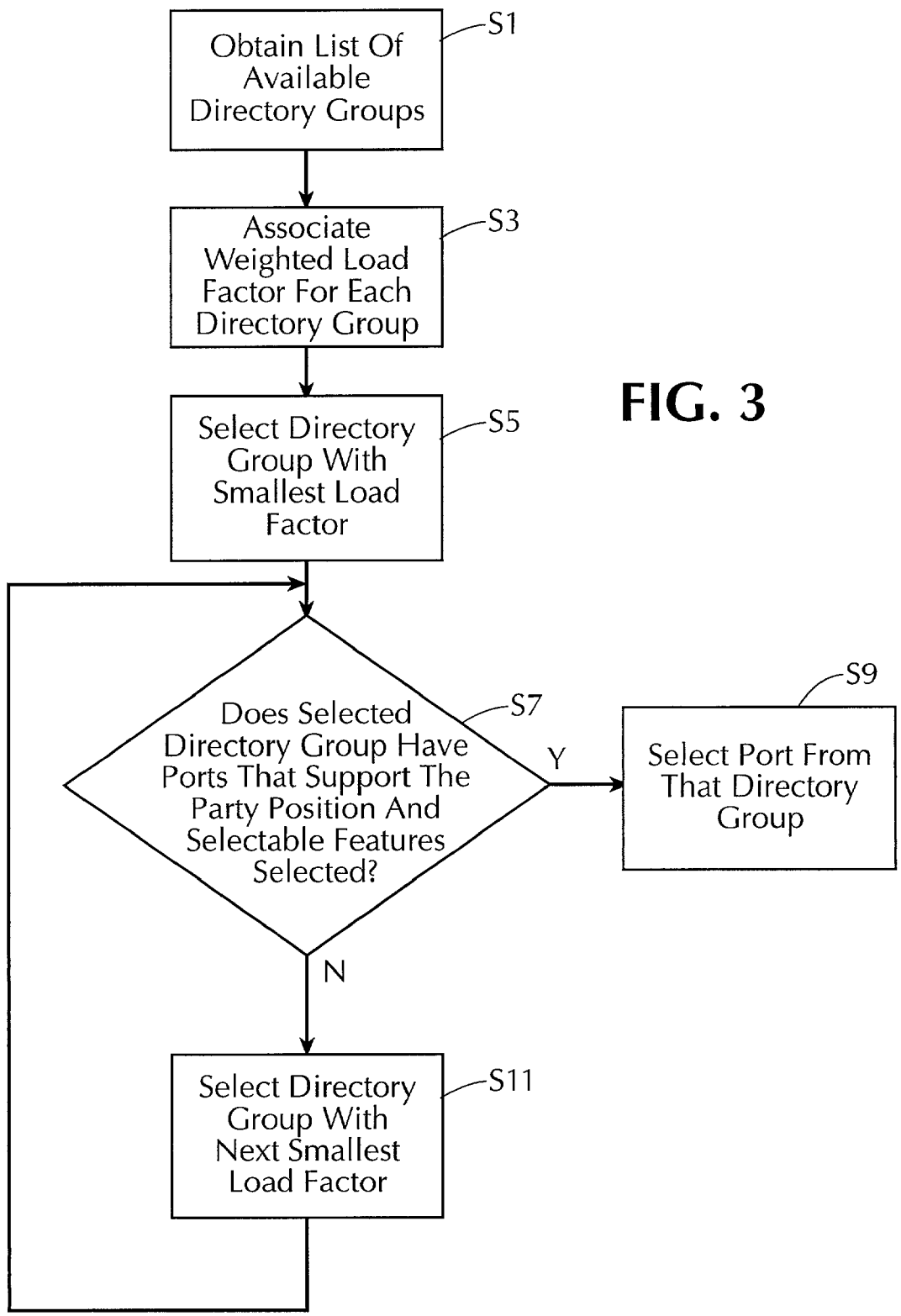
FIG. 3 is flowchart illustrating the steps involved in selecting a directory group using the load balancing method of the present invention.
Figure 4:
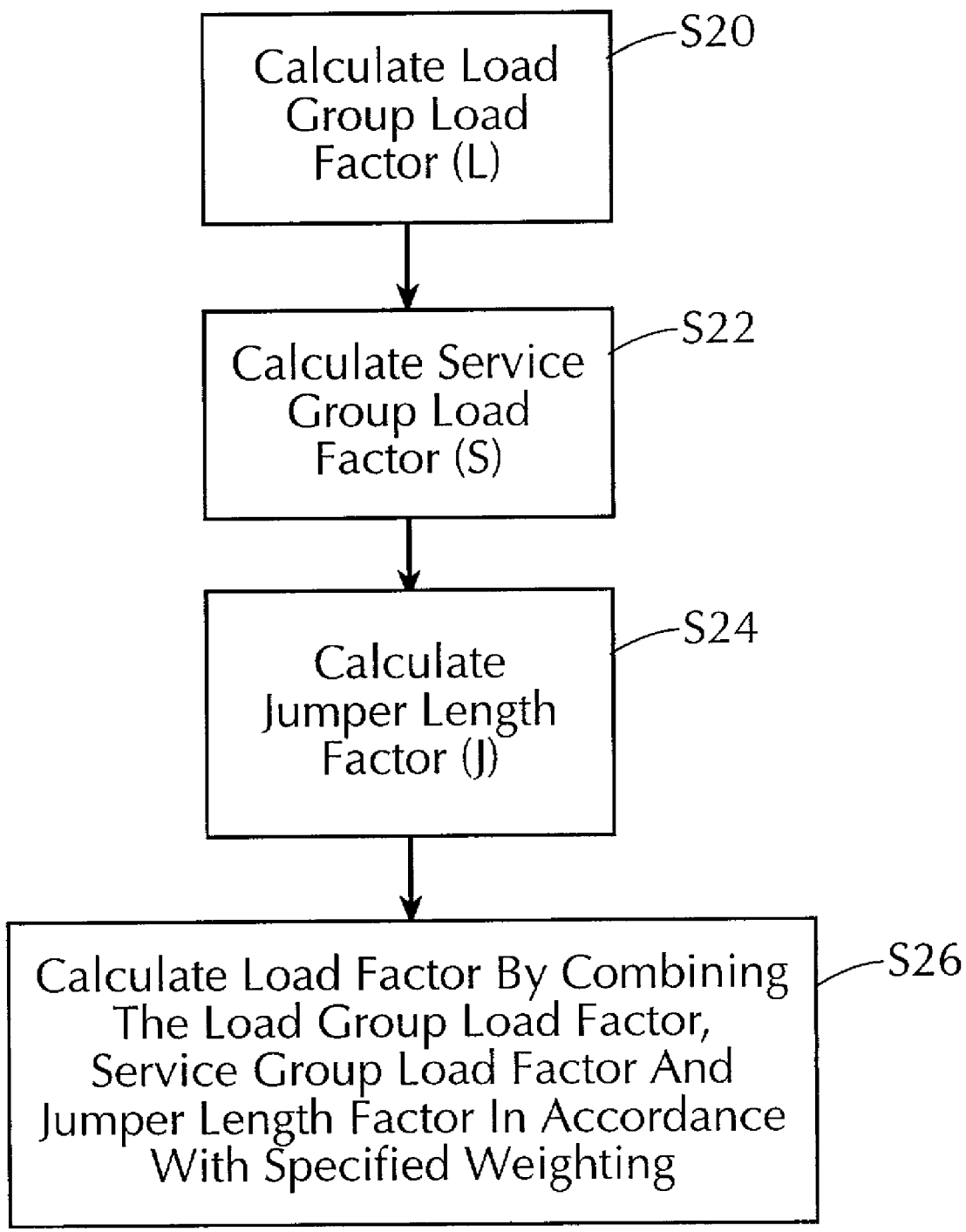
FIG. 4 is a flowchart illustrating the steps involved in calculating the weighted load factor to be used in switch load balancing in accordance with the present invention.

Next, for each group of card types of the same cost, and in increasing order of card cost, the steps illustrated in the flowchart of FIGS. 3 and 4 are performed. At step Si, a list of available directory groups is obtained. To be considered an available group, a directory group must satisfy the following criteria: a) it must contain at least one available port of the correct card type; b) its load group control limit, to be described below, must not have been reached or exceeded; and c) its filled ports count must be less than its equipped ports count, that is, there must be vacant ports in the directory group. A load group control limit takes into account the fact that to balance the port assignment on a switch, ports are divided into load groups. A limit is set per load group such that the port assignment should never goes above this limit. The limit is referred to as the load group control limit. The filled ports count is the total number of filled, i.e., assigned ports in a group. The equipped ports is the total number of ports that can be assigned, which does not include bad ports, which cannot be assigned.

Next, at step S3, for each directory group, a weighted load factor is calculated and associated with the directory group. The steps involved in the calculation of the weighted load factor will be discussed below with reference to FIG. 3.

Once the weighted load factor has been calculated for each directory group, at step S5, the directory group with the smallest weighted load factor is selected. At step S7, it is determined if the currently selected directory group has a port that supports the party position and has any selectable features actually selected. If there is no port meeting these criteria from within the directory group currently being considered, then at step S11 the next directory group is selected. The process continues until a directory group is found that has such a port. It should be noted at this point that in the case of multiple line equipment (LNI) selection, the directory group's load factor must be recalculated after each LNI is selected to ensure complete balancing of the switch.

FIG. 4 is a flowchart illustrating the steps involved in determining the weighted load factor for the current directory group. The load factor is a figure used in load balancing taking into account the load groups factor, the service class group factor and the jumper length factor. In calculating the weighted load factor for a directory group, the load group factor (L), the service class group factor (S), and the jumper length load factor (J) are combined.

At step S20, the load group load factor (L) is calculated. The load group load factor equals the total number of working ports in a directory group divided by the total number of equipped ports in a directory group. At step S22, the service class group load factor (S) is calculated. This factor is equal to the total number of working ports for a service class group in a directory group divided by the total number of available ports for that service class group in the directory group. The service class group for a port is determined by the service type and the requested features that can be supplied from that port.

At step S24, in the case of a frame-mapped central office, the distance of the directory group from the frame appearance of the wire pair or carrier channel is calculated and used to calculate a jumper length factor (J), which is equal to the distance of the current directory group from the feeder pair divided by the maximum distance of the available directory groups. At step S26, these three calculated figures then are combined using weighting percentages, specified by the technician, to calculate the weighted load factor for the directory group. The weighting percentages may be specified, for example, in a graphical user interface screen. The percentages include percentages corresponding to the load group weight (XL), the service class group weight (XS) and the jumper length weight (XJ), which are combined to produce a weighted load factor for the directory group. The factors and weighting are combined according to the following formula:

$$\text{Load Factor} = (L*XL) + (S*XS) + (J*XJ)$$

For example, if equal consideration should be given to all three of the above factors when performing load balancing of the switch, the percentages 34%, 33% and 33% should be specified by the technician. On the other hand, if XJ is chosen to be 100%, and XL and XS chosen to be zero, the only criterion that will be used to select a directory group will be which group has the shortest jumper. Note that the three weighting percentages together must add up to 100%.

The technique of the present invention for selecting which directory group should be used to provide a particular service and to best maintain load balancing on the switch has been described above. Next, certain detailed aspects of the invention will be described. Specifically, the following section describes various entities that affect the LNI selection. It also describes the relationship of these entities in table form. The software of the present invention utilize the entities as discussed.

Features are the primary criteria upon which the selection of line equipment is based. In the software of the present invention, each feature or service available to the customer preferably has a numeric value assigned to it, and an acronym which uniquely identifies the feature state. Examples of features are CNID, for caller number id, CW, for call waiting, etc. Features can be categorized in three types, namely, hardware features, software features and both (mixed). A line equipment (LNI) selection is made based upon the features supported by the switch and card (hardware and mixed) features supported by the card itself.

Card feature state mapping will next be described. Every card can be thought of as having a feature mapping that describes the capabilities of that type of card. A card can have selectable and fixed features. Selectable features in a card are features that the ports in that card do not by default support. Rather, such features have to be selected for a port to be available. In contrast, the fixed features all are supported by all the ports of a card type. The software of the present invention preferably allows card features to be mapped or unmapped, for example by a technician, to a template table that defines the properties of a card, to be referred to as a "metacard", via a graphical user interface screen.

Service class group (SCG) will next be discussed in more detail. In most telecommunications systems, primary service types have been put together into a smaller number of service class groups depending upon the common features they share among themselves. The software of the present invention preferably allows the relationship between the service type and service class group be viewed and modified via a graphical user interface screen. For each service class group, the software preferably requires that there is a list of particularly important features referred to as driving features. For any combination of primary features to be classified in one of the service class groups, at least the driving features must be specified.

Card type to service class group mapping will next be described. Each card type supports certain features. Depending upon these features, each card type is mapped to one, or more than one, service class group. When such a mapping is established, a card is said to be supporting one or more service class groups. Similarly, multiple service class groups can be supported by more than one card type.

Thus there is a many to many relationship between card type and an service class group. This mapping is preferably available for viewing on a dedicated graphical user interface screen on a telecommunication provisioning program.

Service type to service class group mapping will next be described. There is a relationship between service type and service class group. This relationship may be characterized as being one to many, from service class group to service type. That is, one service class group can comprise multiple service types. However, one service type can be mapped to one and only one service class group. This mapping preferably is available for viewing on a dedicated graphical user interface screen.

The software of the present invention that treats the load group as a logical group at which the switch is balanced. As will be recalled from FIG. 1, a load group is always above or at the same logical level as the directory group (meaning lg_level is always smaller that dg_level for a particular piece of equipment), and below or the same logical level as the equipment.

A load group list for particular switch equipment preferably can be viewed via a dedicated graphical user interface screen for that purpose or a complete search on the load group can be made using a dedicated search screen. Preferably, the software provides a dedicated graphical user interface screen that shows the detail of a load group, including its service class groups. In a preferred embodiment of the present invention, each load group contains a service class group count table, which is used to specify the limits for individual service class groups within a load group. A load group can be in one of the following states:

AVA (available status) for all assignment: A load group in this status is open for all the assignment. Automatic assignment uses only those load groups in this status.

NAV (not available status) for all assignment: A load group in this status is completely shut down. No assignments can be made on ports belonging to this load group. The working services cannot move to leftins when they go out of service. They must be broken.

AVA for leftins, leftins referring to equipment left in its position: No automatic assignment can be made on ports belonging to load group with this status. However, manual assignments can be made using ports in left in jumper (LIJ) or express dial tone (EDT) states but not in available status. Also, working services can be moved to leftins. New leftins can be created.

AVA for old leftins: This status works same as AVA for leftins, with the exception that no new leftin creation is allowed. Working services must be broken when going out of services.

The control limit is a number that specifies the maximum number of LNIs that can be assigned for a switch load group, service class group (in a load group). At the switch level, the control limit is specified in terms of percentage and is referred to as capacity fill, the percentage of equipped ports that can be used for assignments. The total of actually assigned ports in working (WKG) status cannot exceed the capacity fill percentage for the switch.

For an individual load group, the software sets the control limit in terms of the port count. The sum of the total ports in working (WKG), mortgage (MTG), manual assignment (MA), left in jumper (LIJ), express dial tone (EDT) and reserved (RSD) (for order) must not exceed the limit in the load group.

For a service class group, the sum of WKG, MA and RSD (for order) for a specific service class group should not exceed the limits set at the service class group for that load group. Note that the service class group limit does not account for LIJ, MTG, and EDT ports as they do not have a service type associated with them.

Preferably, the load group limits and service class group limits can be set for an individual load group using a graphical user interface screen. The program preferably allows a mass edit to be made on a group of load groups using a graphical user interface screen.

The service class group ratio is a number used by the software of the present invention that defines the percentage of equipped ports that can be assigned for each service class group. This ratio is specified at the switch level and controls the service class group counts at the switch level, while the individual load groups can be controlled by the load group service class group control limits. In any case the total service class group count for the switch must not cross the switch level threshold.

As was discussed above, the load group weight, service class group weight, and jumper length weight, which preferably can be specified for any given switch via a graphical user interface screen, are used by the load-balancing program of the present invention to identify the best port to pick. The sum of these weights entered, expressed as percentages, must equal 100%. A 33%, 33%, 34% weighting would mean that all three factors are considered to be at equal footing for load balancing, in this case with jumper length having a slight advantage of 1%. These factors then are used to weight a load group, or more accurately a directory group, since load group weights are aggregation of directory groups, to find which load groups to be picked. A higher percentage value in weighting jumper length would mean that the having the shortest jumper is given the highest priority in comparison with the percentage of fill of the load group or the service class group. In any case, the limits are always maintained whatever the weights are. Also, in the case of a central office that is not frame mapped, which would not have the feeder and ports positions inventory in the database, the jumper length weight is ignored and the remaining weights are normalized to 100%.

To account for the service class group factor, the software utilized by the present invention maintains a service class group count table. No more than a maximum set of services can be provided in any particular load group. Each possible service belongs to a service class group. Hence, while providing service, a limit is set for the service class group. The table allows the software to keep track of the port counts in the various service class groups.

Next will be described how in the software program of the present invention populates the data in the service class group count table. First, each card type is mapped to one or more service class groups. Whenever a new card is created, ports for each service class group are set as the equipped ports for the new card. The number of vacant ports for each service class group is initially set as being equal to the equipped ports. A control limit for each service class group is set depending upon a service class group ratio specified for the switch. Whenever a new service is assigned and a port is selected, the service type for which a port is assigned must be identified and the mapping of service type and the service class group must be found. For the obtained service class group, a working ports count must be incremented by the number of LNIs assigned. The card type and the mapping of the service class group are then identified for that card type. From all service class groups, the vacant port count is reduced by the number of assigned LNIs.

The above process can be explained with the help of an example. Consider a hypothetical load group TCU0011 having three cards, two of which are of type 50 and one is of type 51. Assume that both types of cards have 4 ports.

The software of the present invention creates a card_type_scg_map table, showing the mapping between card type and service class group as follows:

TABLE 1

| Card Type | Service Class Group |
| --- | --- |
| 50 | 1 |
| 50 | 2 |

TABLE 1-continued

| Card Type | Service Class Group |
| --- | --- |
| 50 | 5 |
| 50 | 6 |
| 50 | 9 |
| 50 | 10 |
| 51 | 1 |
| 51 | 2 |
| 51 | 6 |
| 51 | 8 |
| 51 | 9 |
| 51 | 10 |

A load group table is set up to show the following information:

TABLE 2

| Load Group | Total Eqp | Total Wkg | Control Lim | Total Vac | Total EDT | Total LIJ |
| --- | --- | --- | --- | --- | --- | --- |
| TCU0011 | 12 | 0 | 12 | 12 | 0 | 0 |

A service class group count table is set up to contain the following data:

TABLE 3

| Load Group | SCG | | Eqp Ports | Wkg Ports | Control Lim | Vac Ports |
| --- | --- | --- | --- | --- | --- | --- |
| TCU0011 | 1 | POTSR | 12 | 0 | 12 | 12 |
| TCU0011 | 2 | POTSB | 12 | 0 | 12 | 12 |
| TCU0011 | 3 | SPL | 0 | 0 | 0 | 0 |
| TCU0011 | 4 | COIN | 0 | 0 | 0 | 0 |
| TCU0011 | 5 | IWTS | 8 | 0 | 8 | 8(Only 50) |
| TCU0011 | 6 | TEST | 12 | 0 | 12 | 12 |
| TCU0011 | 7 | ISDN | 0 | 0 | 0 | 0 |
| TCU0011 | 8 | INTRNET | 4 | 0 | 4 | 4(Only 51) |
| TCU0011 | 9 | SPFEAT | 12 | 0 | 12 | 12 |
| TCU0011 | 10 | LH | 12 | 0 | 12 | 12 |

In the above example, it can be seen that the card type 50 does not map to INTRNET, which is SCG 8. Hence only card type 51, which has 4 ports in total, can be used to effect the Internet service (SCG 8). Also, the IWTS service group 5 is only mapped to card type 50. Hence the total number of ports in cards 50 (2 cards×4 ports) equals 8. The service class groups belong to both the cards making their counts 12, that is, the total number of ports which can support these service class groups is 12.

Now consider that case where the new services are requested as follows (numbers in bracket are corresponding SCG):

| SCG | Ports |
| --- | --- |
| POTSR (Plain Old Telephone Service Residential) (1) | 3 |
| POTSB (Plain Old Telephone Service Business) (2) | 2 |
| INTRNET (8) | 2 |

After the assignments for each service class group, in that order the data in load group and the service class group count table will change as follows. After assigning 3 ports in POTSR the load group table will read:

TABLE 4

| Load Group | Total Eqp | Total Wkg | Control Lim | Total Vac | Total EDT | Total LIJ |
|---|---|---|---|---|---|---|
| TCU0011 | 12 | 3 | 12 | 9 | 0 | 0 |

After assigning 2 ports to POTSB, the load group table will read:

TABLE 5

| Load Group | Total Eqp | Total Wkg | Control Lim | Total Vac | Total EDT | Total LIJ |
|---|---|---|---|---|---|---|
| TCU0011 | 12 | 5 | 12 | 7 | 0 | 0 |

After assigning 2 ports to INTRNET, the load group table will read:

TABLE 6

| Load Group | Total Eqp | Total Wkg | Control Lim | Total Vac | Total EDT | Total LIJ |
|---|---|---|---|---|---|---|
| TCU0011 | 12 | 7 | 12 | 5 | 0 | 0 |

After assigning 3 ports in POTSR, the service class group count table will read:

TABLE 7

| Load Group | SCG | Eqp Ports | Wkg Ports | Control Lim | Vac Ports |
|---|---|---|---|---|---|
| TCU0011 | 1 | 12 | 3 | 12 | 9 |
| TCU0011 | 2 | 12 | 0 | 12 | 9 |
| TCU0011 | 3 | 0 | 0 | 0 | 0 |
| TCU0011 | 4 | 0 | 0 | 0 | 0 |
| TCU0011 | 5(Only 50) | 8 | 0 | 8 | 5 |
| TCU0011 | 6 | 12 | 0 | 12 | 9 |
| TCU0011 | 7 | 0 | 0 | 0 | 0 |
| TCU0011 | 8(Only 51) | 4 | 2 | 4 | 4 |
| TCU0011 | 9 | 12 | 0 | 12 | 9 |
| TCU0011 | 10 | 12 | 0 | 12 | 9 |

After assigning 2 ports to POTSB the service class group count table will read:

TABLE 8

| Load Group | SCG | Eqp Ports | Wkg Ports | Control Lim | Vac Ports |
|---|---|---|---|---|---|
| TCU0011 | 1 | 12 | 3 | 12 | 7 |
| TCU0011 | 2 | 12 | 2 | 12 | 7 |
| TCU0011 | 3 | 0 | 0 | 0 | 0 |
| TCU0011 | 4 | 0 | 0 | 0 | 0 |
| TCU0011 | 5(Only 50) | 8 | 0 | 8 | 3 |
| TCU0011 | 6 | 12 | 0 | 12 | 7 |
| TCU0011 | 7 | 0 | 0 | 0 | 0 |
| TCU0011 | 8(Only 51) | 4 | 2 | 4 | 4 |
| TCU0011 | 9 | 12 | 0 | 12 | 7 |
| TCU0011 | 10 | 12 | 0 | 12 | 7 |

After assigning 2 ports to INTRNET it will read:

TABLE 9

| Load Group | SCG | Eqp Ports | Wkg Ports | Control Lim | Vac Ports |
|---|---|---|---|---|---|
| TCU0011 | 1 | 12 | 3 | 12 | 5 |
| TCU0011 | 2 | 12 | 2 | 12 | 5 |
| TCU0011 | 3 | 0 | 0 | 0 | 0 |
| TCU0011 | 4 | 0 | 0 | 0 | 0 |
| TCU0011 | 5(Only 50) | 8 | 0 | 8 | 3 |
| TCU0011 | 6 | 12 | 0 | 12 | 5 |
| TCU0011 | 7 | 0 | 0 | 0 | 0 |
| TCU0011 | 8(Only 51) | 4 | 2 | 4 | 2 |
| TCU0011 | 9 | 12 | 0 | 12 | 5 |
| TCU0011 | 10 | 12 | 0 | 12 | 5 |

Note that the above example shows only working (WKG) service transitions. However, the example can be extended by analogy for RSD and MA ports.

The possible port statuses, and their impact on the load group/SCG tables discussed above, will now be described.

With respect to the load group, the effective working ports on a load group are WKG (includes suspended, toll disconnect, etc); RSD (for order only); MTG; LIJ; EDT; and MA. WKG ports are the sum of WKG+RSD+MA+MTG. The LIJ and EDT ports have their own column display. However, they are all summed up when counting the effective working ports in a load group.

The following statuses are considered working for a service class group: WKG (includes suspended, toll disconnect, etc); RSD (for order only); and MA. The service class group does not include MTG, LIJ and EDT ports as they do not have a service type associated with them.

This section lists GUI screens and reports that preferably can be implemented by the software of the present invention to assist in providing load balancing maintenance of the LNI selections. A switch flags screen may be provided to function as an assignment control screen. Such a screen can be used for display/modification of various assignment control flags as well as load factors for the entire switch.

A load group selection screen may be provided as a load group inquiry screen for load group and service class group control limits maintenance and load group statuses.

A load group detail screen may be provided to allow a technician to have a more detailed view of the load group and service class group limit table for the load group.

A load group list screen may be provided that lists the load groups for specific equipment.

An LNI Avail screen may be provided that displays an available port list for the entire switch.

A switch report screen may be provided to show a switch-wide summary report, which displays the following: distribution of ports according to location, status and status flags; distribution of working ports according to the service class group; distribution of manually available (MAV) ports according to service class group; and distribution of Reserved for Order (RSD_ORD) ports according to service class group.

The load balancing invention of the present invention has been described above with respect to particular illustrative embodiments and examples. It is to be understood, however, that the invention is not limited to those embodiments, examples, and systems, and that various changes and modifications may be made by those of ordinary skill in the art without departing from the spirit and the scope of the appended claims.

What is claimed:

1. A computer implemented method for effecting inside plant load balancing in a telecommunications system, the system including at least one switch, each switch including a plurality of cards, each card having a plurality of ports, each port being adapted to provide a customer with one or more telecommunications services, the method comprising:

compiling a list of switches, cards and ports available for providing the desired services; and selecting a port for provision of the desired service on the basis of one or more of (a) an extent to which other ports on the card on which the port under consideration is located are in use, (b) a loading of services on the card, (c) a length of jumper wire necessary to connect the port under consideration to a frame in a telecommunications central office, (d) a cost of the card on which the port under consideration is located, and (e) selected percentage weighting factors for the respective priorities of (a), (b) and (c).

2. A method according to claim 1, wherein in the compiling step, the fist of available switches, cards and ports is maintained in a table in a database.

3. A method according to claim 1, further comprising soliciting from a user the percentage weighting factors for the respective priorities of (a), (b) and (c), the weighting factors adding up to 100%.

4. A method according to claim 3, wherein in the selecting step, available cards are analyzed one by one, in decreasing order of cost, on the basis of (a), (b) and (c).

5. A method according to claim 4, wherein the ports on each switch are divided into one or more switch equipment groups, each switch equipment group is divided into one or more load groups, and each load group is divided into one or more directory groups, the loading of the ports on a card being determined on a load group basis, and the connection of ports to a frame being effected in units of directory groups.

6. A computer-readable memory medium for controlling a processor-controlled apparatus to effect inside plant load balancing in a telecommunications system, the system including at least one switch, each switch including a plurality of cards, each card having a plurality of ports, each port being adapted to provide a customer with one or more telecommunications services, the apparatus being controlled to perform a method comprising:

compiling a list of switches, cards and ports available for providing the desired services; and selecting a port for provision of the desired service on the basis of one or more of (a) an extent to which other ports on the card on which the port under consideration is located are in use, (b) a loading of services on the card, (c) a length of jumper wire necessary to correct the port under consideration to a frame in a telecommunications central office, (d) a cost of the cord on which the port under consideration is located, and (e) selected percentage weighting factors for the respective priorities of (a), (b) and (c).

7. A computer-readable memory medium according to claim 6, wherein in the compiling step, the list of available switches, cards and ports is maintained in a table in a database.

8. A computer-readable memory medium according to claim 6, the method further comprising soliciting from a user the percentage weighting factors for the respective priorities of (a), (b) and (c), the weighting factors adding up to 100%.

9. A computer-readable memory medium according to claim 8, wherein in the selecting step, available cards are analyzed one by one, in decreasing order of cost, on the basis of (a), (b) and (c).

10. A computer-readable memory medium according to claim 9, wherein the ports on each switch are divided into one or more switch equipment groups, each switch equipment group is divided into one or more load groups, and each load group is divided into one or more directory groups, the loading of the ports on a card being determined on a load group basis, and the connection of ports to a frame being effected in units of directory groups.

11. An apparatus adapted to effect inside plant load balancing in a telecommunications system, the system including at least one switch, each switch including a plurality of cards, each card having a plurality of ports, each port being adapted to provide a customer with one or more telecommunications services, the apparatus comprising:

a processor;

means, in communication with the processor, for compiling a list of switches, cards and ports available for providing the desired services; and means, in communication with the processor, for selecting a port for provision of the desired service on the basis of one or more of (a) an extent to which other ports on the card on which the port under consideration is located are in use, (b) a loading of services on the card, (c) a length of jumper wire necessary to connect the port under consideration to a frame in a telecommunications central office, (d) a cost of the card on which the port under consideration is located, and (e) selected percentage weighting factors for the respective priorities of (a), (b) and (c).

12. An apparatus according to claim 11, wherein the compiling means maintains the list of available switches, cards and ports in a table in a database.

13. An apparatus according to claim 11, further comprising a means for soliciting from a user the percentage weighting factors for the respective priorities of (a), (b) and (c), the weighting factors adding up to 100%.

14. An apparatus according to claim 13, wherein the selecting means analyzes available cards one by one, in decreasing order of cost, on the basis of (a), (b) and (c).

15. An apparatus according to claim 14, wherein the ports on each switch are divided into one or more switch equipment groups, each switch equipment group is divided into one or more load groups, and each load group is divided into one or more directory groups, the loading of the ports on a card being determined on a load group basis, and the connection of ports to a frame being effected in units of directory groups.

16. Computer code for controlling a computer to effect inside plant load balancing in a telecommunications system, the system including at least one switch, each switch including a plurality of cards, each having a plurality of ports, each port being adapted to provide a customer with one or more telecommunications services, the computer code comprising:

code for compiling a list of switches, cards and ports available for providing the desired services; and code for selecting a port for provision of the desired service on the basis of one or more of (a) an extent to which other ports on the card on which the port under consideration is located are in use, (b) a loading of services on the card, (c) a length of jumper wire necessary to connect the port under consideration to a frame in a telecommunications central office, (d) a cost of the card on which the port under consideration is located, and (e) selected percentage weighting factors for the respective priorities of (a), (b) and (c).

17. Computer code according to claim 16, wherein in the code for compiling maintains the list of available switches, cards and ports in a table in a database.

18. Computer code according to claim 16, the code further comprising code for soliciting from a user the percentage weighting factors for the respective priorities of (a), (b) and (c), the weighting factors adding up to 100%.

19. Computer code according to claim 18, wherein in the code for selecting, available cards are analyzed one by one, in decreasing order of cost, on the basis of (a), (b) and (c).

20. Computer code according to claim 19, wherein the ports on each switch are divided into one or more switch equipment groups, each switch equipment group is divided into one or more load groups, and each load group is divided into one or more directory groups, the loading of the ports on a card being determined on a load group basis, and the connection of ports to a frame being effected in units of directory groups.

* * * * *